Jan. 30, 1945.   R. F. GIBBONS   2,368,465
POWER LINE TRANSFER AND DISCONNECT SWITCH
Filed June 5, 1943   2 Sheets-Sheet 2
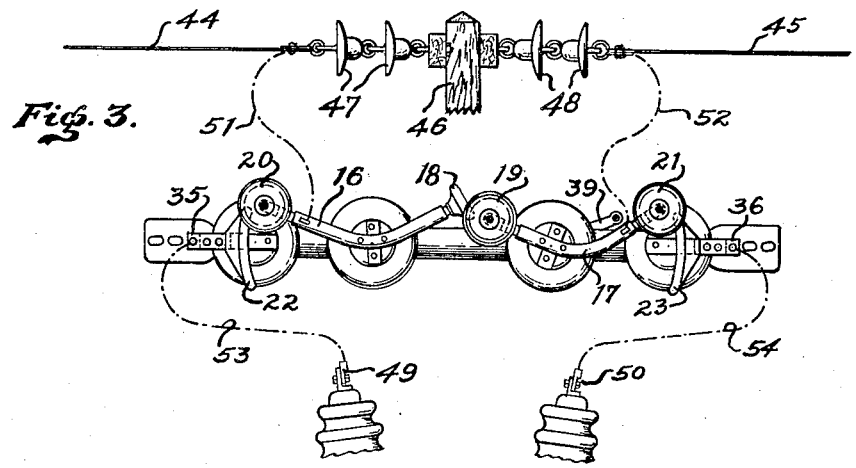
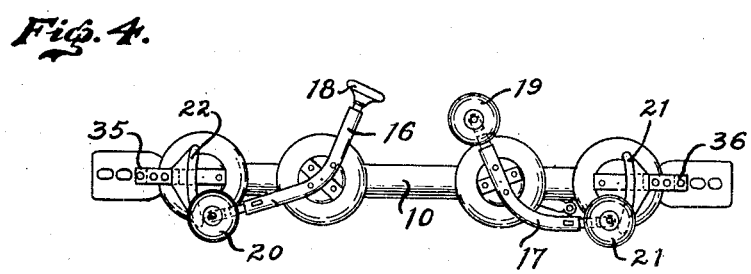
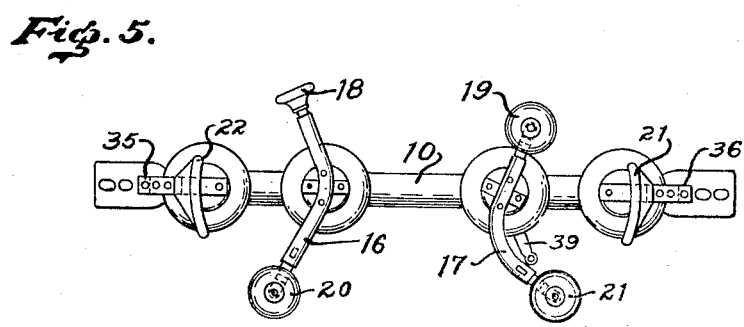
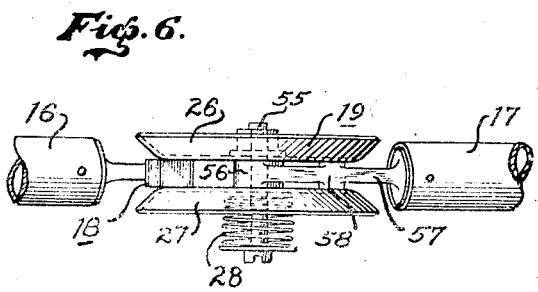
INVENTOR.
RICHARD F. GIBBONS.
BY
*W. H. Atkinson*
ATTORNEY.

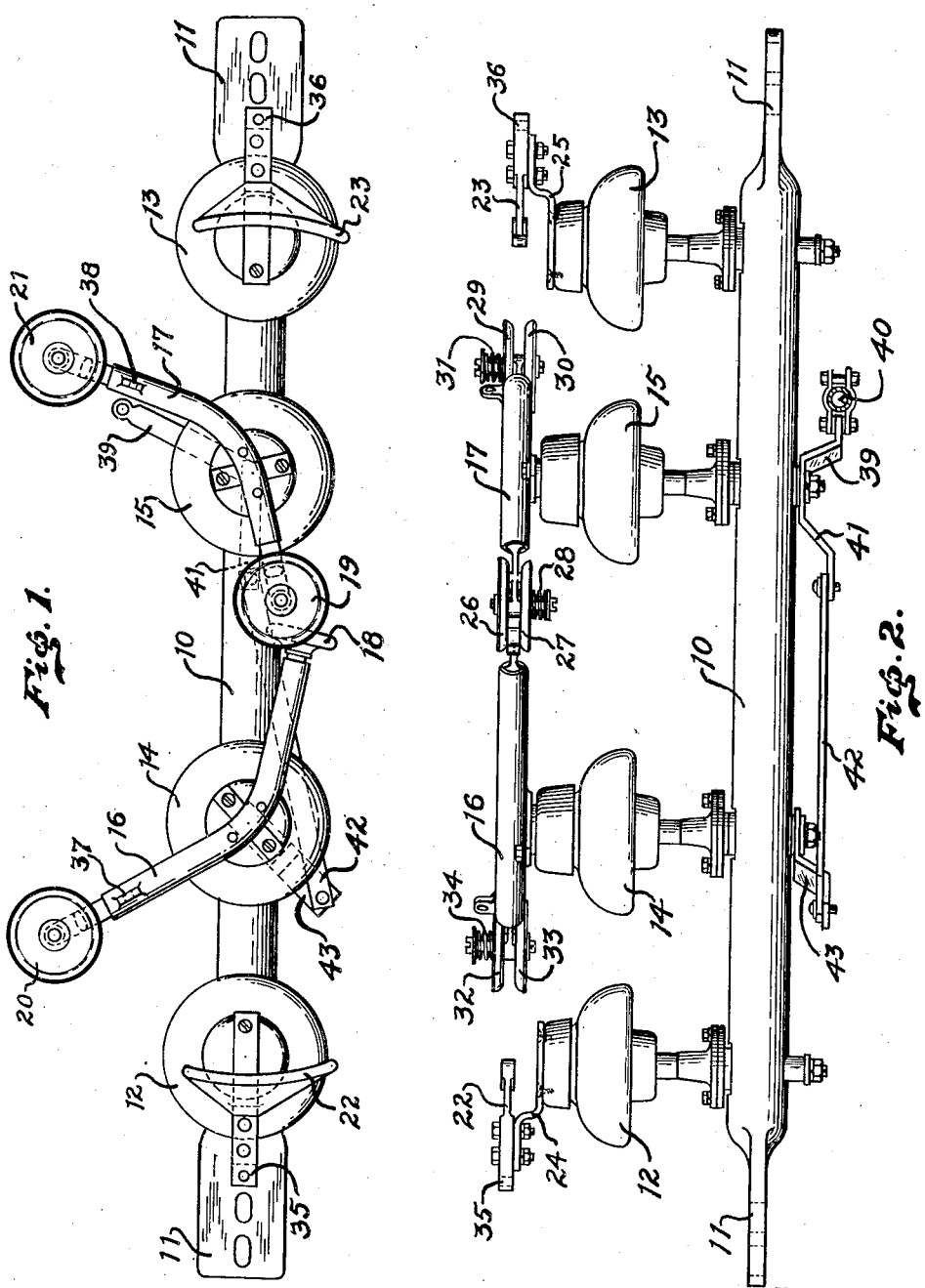

Patented Jan. 30, 1945

2,368,465

UNITED STATES PATENT OFFICE 2,368,465

POWER LINE TRANSFER AND DISCONNECT SWITCH

Richard F. Gibbons, Burlingame, Calif., assignor to Pacific Electric Manufacturing Corporation, San Francisco, Calif., a corporation of California Application June 5, 1943, Serial No. 489,792

5 Claims. (Cl. 200—2)

My present invention relates to electrical power line switches, and more particularly to a switch of novel construction for use upon a high potential power distributing system for connecting and disconnecting a circuit or apparatus in series with a power line without an interruption in the power line circuit.

An object of the invention is to provide a practical switch of novel construction which can be used as a means to connect and disconnect apparatus or a branch line circuit in series with a power line without causing any interruption in the power line circuit.

Another object of the invention is to provide a simple and inexpensive switching apparatus which may be controlled by a single operating means to open the power line circuit and/or to connect and disconnect apparatus or an auxiliary circuit in series with a power line conductor without any interruption in the power line circuit.

Other objects and advantages of the invention will be in part evident to those skilled in the art and in part pointed out hereinafter in the following description taken in connection with the accompanying drawings, wherein there is shown by way of illustration and not of limitation a preferred embodiment thereof.

In the drawings:

Figure 1 is a plan view of a switch constructed in accordance with the invention, Figure 2 is a side elevation showing further details of the switch illustrated in Figure 1, Figure 3 is a diagrammatic fragmentary view showing one application of a switch constructed in accordance with the invention, Figures 4 and 5 are plan views showing the switch in two other operating positions, and Figure 6 is an enlarged fragmentary view showing details of a contact arrangement which is particularly suited for use upon a switch of the type illustrated.

The problem of connecting and disconnecting apparatus in series with a power line circuit without an interruption in the service is not a new one. However, up to the present time, in order to accomplish such a connection or disconnection of the apparatus, a large number of independent switching means and controls have been required. For example, on a three-phase circuit as many as nine individual stick operated switches were required, and where three-phase group operated switches are employed, three separate operating controls are necessary. In other cases, where the number of switching units are reduced in number, there still is required a complicated interlocking control of the individual switches to insure that the switching units are opened and closed in the proper sequence. As distinguished from the prior art arrangements, it is possible with the present invention to effect a series connection and disconnection of electrical apparatus in a power transmission circuit without an interruption in the circuit and, if desired, to also by-pass the apparatus and/or open the power line circuit at the point where the apparatus is connected thereto. Among other possible uses for a switch constructed in accordance with this disclosure is the connecting and disconnecting of an incoming power line to a voltage regulator; to connect or disconnect such a regulator to an outgoing bus; to transfer an incoming power line from a regulator to an outgoing bus and, in the field, my improved switch may be used to connect and/or disconnect a sectionalizing circuit breaker, a current transformer or other series connected apparatus in a power line transmission system without any interruption in the service.

In the accompanying drawings there is illustrated a switch constructed in accordance with a preferred embodiment of the invention. For simplicity, only a single switch unit is shown, it being understood that when in use, two of these switch units may be used in parallel in a direct current or single phase alternating current transmission line, and where the switch is to be used in connection with an alternating current power transmission line of three or more phases, a corresponding number of these switch units may be required, one for each conductor of the power line circuit. As illustrated, the switch is mounted upon a series of four insulators that are secured in alignment upon a single pipe-like support, designated by the numeral 10. The pipe-like support 10 is flattened at its ends so as to provide securing pads 11 at these points which may be secured upon spaced cross-arms of a pole or transmission line supporting tower. The outer two of the four spaced insulator columns, designated by the numerals 12 and 13, are fixed upon the pipe-like support 10, and the two inner insulator columns, designated by the numerals 14 and 15, are rotatably mounted in properly spaced relation with respect to each other and with respect to the stationary insulator columns 12 and 13. At their upper ends the rotatable insulator columns 14 and 15 respectively carry transversely extending switch blade forming members 16 and 17 that are adapted to move in a plane transverse to the axis of rotation of their supporting insulator columns. At their inner adjacent ends the switch blade forming members 16 and 17 carry cooperating flat and disc-like contact members 18 and 19, and at their outer ends these switch blade forming members carry other disc-like contact members 20 and 21 which respectively cooperate with flat stationary contacts 22 and 23 that are secured to and supported at the upper ends of the outer or stationary insulator columns 12 and 13. By referring to Figure 2 of the drawings, it will be noted that the stationary contacts 22 and 23 are supported upon their respective insulator columns 12 and 13 by means of brackets 24 and 25 so that they may be engaged on both sides by the contacts 20 and 21 at the outer ends of the switch blade forming members 16 and 17.

While the switch constructed in accordance with my invention may employ various forms of circuit completing contacts at the ends of the switch blade forming members 16 and 17, these members are here shown as provided with full wiping circuit completing contacts of the type illustrated in United States Patent No. 1,965,272 issued to Roy Wilkins and assigned to the assignee hereof. As illustrated in Figure 2 of the drawings, the contact 19 comprises two oppositely disposed and rotatable current conducting discs 26 and 27 that are held in an operative relation with respect to each other upon the end of the switch blade forming member 17 by means of a compression spring 28. Similarly, the contact 21 at the outer end of the switch blade forming member 17 comprises two oppositely disposed contact discs 29 and 30 which are held in cooperating relation with respect to each other by a compression spring 31. The third rotatable contact means 20, at the outer end of the switch blade forming member 16, likewise comprises two spaced rotatable contact discs 32 and 33 that are held in position by a compression spring 34. At this point it will be noted that the stationary contacts 22 and 23 are provided with insulated conductor terminals 35 and 36, and for the purpose of completing a connection with the power line circuit, the switch blade forming members 16 and 17 respectively carry terminal lugs or bosses 37 and 38 from which connections may be made with the dead ends of a transmission line conductor, as will hereinafter appear.

As is also shown in Figure 2 of the drawings, the insulator columns 14 and 15 are rotatably mounted upon the pipe-like support 10. At its lower end, the insulator column 15 carries an operating crank arm 39 which is connected to a transversely extending pipe or rod 40 by means of which two or more of the switch units may be tied together and simultaneously controlled by a single operating means. Extending opposite the crank arm 39 the insulator column 15 also carries a second crank arm 41 that is connected through a link 42 to a similar crank arm 43 which serves to rotate the insulator column 14 in an opposite direction when the operating pipe or rod 40 is moved to control the switch. In other words, when the crank arm 39 is turned clockwise, as viewed in Figure 1 of the drawings, the link 42 will operate upon the crank arm 43 and cause the rotatable insulator column 14 to turn in a counter-clockwise direction.

Reference is now made to Figures 3, 4 and 5 of the drawings for a description on the operation of the switch when used for the purpose of sectionalizing and/or connecting and disconnecting an electrical device in series circuit with a power line conductor. In connection with this operation it will be understood that in the case of a multi-phase circuit, a corresponding number of the switches will be employed to simultaneously control each of the power line conductors. Under the assumed conditions of operation, the switch, as shown in Figure 3 of the drawings, will be located at a point along the transmission system where its power conductors are dead-ended upon a suitable support. As here shown the power line comprises two conductors 44 and 45 that are dead-ended upon the cross-arms of a pole 46 by means of strain insulators 47 and 48, and the apparatus to be connected in series with the power line conductors is diagrammatically indicated by insulator supported current terminals 49 and 50. Under these conditions of operation, the switch blade forming member 16 will be connected to the power line conductor 44 by a flexible connection, indicated by dot and dash lines 51, and the switch blade forming member 17 will be connected to the power line conductor 45 by a similar flexible connection indicated by dot and dash lines 52. At the same time, the terminal 35 of the stationary contact 22 will be connected to the terminal 49 of the electrical device by a conductor, as indicated by dot and dash lines 53, and the stationary contact 23 will be connected to the terminal 50 of the device, as shown by dot and dash lines 54. With this arrangement it will be seen that when the switch blade forming members 16 and 17 are in the position illustrated in Figure 1 of the drawings, with their cooperating contacts 18 and 19 in engagement, a circuit will be completed between the power line conductors 44 and 45. Now, when the switch blade forming member 17 is caused to move by an actuation of the operating rod 40, it will be seen that the switch blade forming member 17 will turn in a clockwise direction while the switch blade forming member 16 will be turned in a counter-clockwise direction. During the initial movement of these switch blade forming members 16 and 17 in this manner, their cooperating contacts 18 and 19 will remain in engagement until the contacts 20 and 21 at the outer ends of the switch blade forming members 16 and 17 have respectively made contact with the stationary contacts 22 and 23. At this point the switch blade forming members 16 and 17 will be in the position illustrated in Figure 3 of the drawings and the circuit between the power line conductors 44 and 45 will not have been interrupted. At the same time the contacts 20 and 21 at the outer ends of the switch blade forming members 16 and 17 will have made engagement with their cooperating stationary contacts 22 and 23 and established a circuit between the dead-ended power line conductors 44 and 45 and the terminals 49 and 50 of the electrical device. From this position further rotation of the rotatable insulator columns 14 and 15 will move the switch blade forming members 16 and 17 into the position shown in Figure 4 of the drawings, where the circuit between the switch blade forming members 16 and 17 will be interrupted, but the terminals 49 and 50 of the electrical device will remain connected in series circuit with the power line conductors 44 and 45. If it should now be desired to sectionalize the transmission system at this location and also disconnect the electrical apparatus therefrom, this can be accomplished by a further movement of the operating rod 40 which will turn the rotatable insulator columns 14 and 15 into the position shown in Figure 5 of the drawings, where the cooperating contacts at the ends of the switch blade forming members 16 and 17 will be moved out of contact with the stationary contacts 22 and 23 and out of contact with each other so as to completely open the circuits normally established thereby.

While it is conceivable that the particular contact means employed at the ends of the switch blade forming members 16 and 17 may take various forms, it will be seen upon an inspection of Figure 6 that the particular construction chosen for illustration will lend itself admirably to the above described mode of operation. As here shown, the contact making discs 26 and 27 of the contact 19, like the discs of the contacts 20 and 21, are journaled upon a shaft 55 that extends through a hub 56 at the end of a flat extension 57 that is carried by the switch blade forming member 17. This extension 57 has a cylindrical end that is secured by drive fit and pinned in the end of the switch blade forming member 17 which is of tubular form. Likewise, the elongated contact member 18 carried by the switch blade forming member 16 has a cylindrical end which is secured by drive fit and pinned upon the corresponding end of the switch blade forming member 16. In addition to the hub 56 at its extreme end, and in order to insure a good electrical contact between the contact discs 26 and 27 and the switch blade forming member 17, the flat extension 57 is also provided with a thickened portion 58 having two flat and opposed contact surfaces which will insure a substantially parallel relation between the contact making discs 26 and 27 when in engagement with the flat contact 18.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a line circuit controlling switch, the combination of a pair of spaced rotatable insulating supports having oppositely extending switch blade forming members secured thereupon, said switch blade forming members having line terminal connections intermediate their ends, contact means carried by adjacent ends of said switch blade forming members adapted to cooperate and complete a circuit therebetween as said rotatable insulating supports turn or remain within a limited arc of movement, a stationary terminal contact disposed outwardly from each of said rotatable insulating supports, circuit completing contact members at the other ends of each of said switch blade forming members adapted to engage said stationary terminal contacts as said rotatable insulating supports move or remain within a further arc of their rotatable movement, and means for simultaneously turning said rotatable insulating supports through opposite and equal angles of movement, whereby said switch blade forming members will first complete a line circuit through said switch blade forming members and their cooperating contacts and subsequently connect said line circuit to apparatus associated with said stationary terminal contacts.

2. In a line circuit controlling switch, the combination of a pair of rotatable insulating supports having oppositely extending switch blade forming members secured thereupon, said switch blade forming members being adapted for connection to a line circuit, contact means carried by adjacent ends of said switch blade forming members adapted to cooperate and complete a line circuit therethrough as said rotatable insulating supports turn or remain within a limited arc of movement, a stationary terminal contact disposed outwardly from each of said rotatable insulating supports, circuit completing contact members at the outer ends of each of said switch blade forming members adapted to engage said stationary terminal contacts as said rotatable insulating supports move or remain within a further arc of their rotatable movement, said stationary terminal contacts being so positioned and arranged that the circuit completing contact members at the outer ends of said switch blade forming members will remain in contact therewith after the cooperating contacts at the adjacent ends of said switch blade forming members have become disengaged, and means for simultaneously turning said rotatable insulating supports through opposite and equal angles of movement, whereby said switch blade forming members will first complete a line circuit through said switch blade forming members and their cooperating contacts and subsequently connect said line circuit to apparatus associated with said stationary terminal contacts without causing any interruption in said line circuit.

3. In an apparatus connecting and disconnecting switch for power line circuits, the combination of a pair of rotatable insulating supports, switch blade forming members having oppositely extending ends carried by said supports, contact means at one end of each of said switch blade forming members adapted to cooperate and complete a circuit between said switch blade forming members while said rotatable insulating supports turn or remain within a limited arc of their movement, a stationary and insulated terminal contact disposed outwardly from each of said rotatable insulating supports, contact members at the other ends of each of said switch blade forming members adapted to simultaneously engage said stationary terminal contacts as said rotatable insulating supports turn or remain within a further arc of their rotatable movement, means for connecting said switch blade forming members in a power line circuit, and means for simultaneously turning said rotatable insulating supports through opposite and equal angles of movement, whereby said switch blade forming members will first operate to complete a line circuit through said switch blade forming members and their cooperating contacts and without any interruption of the power line circuit to subsequently transfer said circuit to and through apparatus connected to said stationary terminal contacts.

4. In a circuit maintaining and apparatus connecting and disconnecting switch, the combination of a support having spaced and insulated terminal contacts adapted to be connected to an electrical device, a pair of oppositely rotatable insulator supports disposed in line with and between said terminal contacts, a switch blade mounted upon and extending transversely of each of said rotatable insulator supports and movable in the plane of said spaced and insulated terminal contacts, contact means carried by the adjacent ends of said switch blades adapted to cooperate and establish a circuit therebetween, other contact means at the outer ends of said switch blades adapted to cooperate with an adjacent stationary contact terminal, said stationary contact terminals having an arcuate dimension greater than the movement required to bring said first contact means out of cooperating relation, and means for simultaneously rotating said switch blade insulator supports in opposite directions, whereby a circuit will be alternately established between said switch blades and between each of said switch blades and an adjacent one of said stationary contact terminals.

5. In a power distribution switch, the combination of a pair of spaced rotatable switch blade members having inwardly disposed engageable ends and outwardly extending contact engaging ends, a power line terminal carried by each of said switch blade members, a stationary contact terminal adapted to be engaged by the outwardly extending end of each of said switch blade members, contact means at the adjacent ends of said switch blade members adapted to complete a circuit therebetween, and means for simultaneously rotating said switch blade members through three operating positions in one of which positions said switch blades will cooperate to establish a circuit therebetween, in another position of which said switch blades will establish independent circuits between the power line terminals carried thereby and each of said stationary contact terminals, and in another position of which said switch blade members will operate to interrupt the circuit between said switch blade members and also interrupt the circuit between the power line terminals carried thereby and said stationary contact terminals.

RICHARD F. GIBBONS.